Jan. 8, 1963    F. P. KING    3,072,199
PIT PLOW
Filed March 8, 1960    3 Sheets-Sheet 1

Ferdinand P. King
INVENTOR.

BY Clarence A. O'Brien
and Harvey B. Jacobson
Attorneys

Jan. 8, 1963  F. P. KING  3,072,199
PIT PLOW
Filed March 8, 1960  3 Sheets-Sheet 2
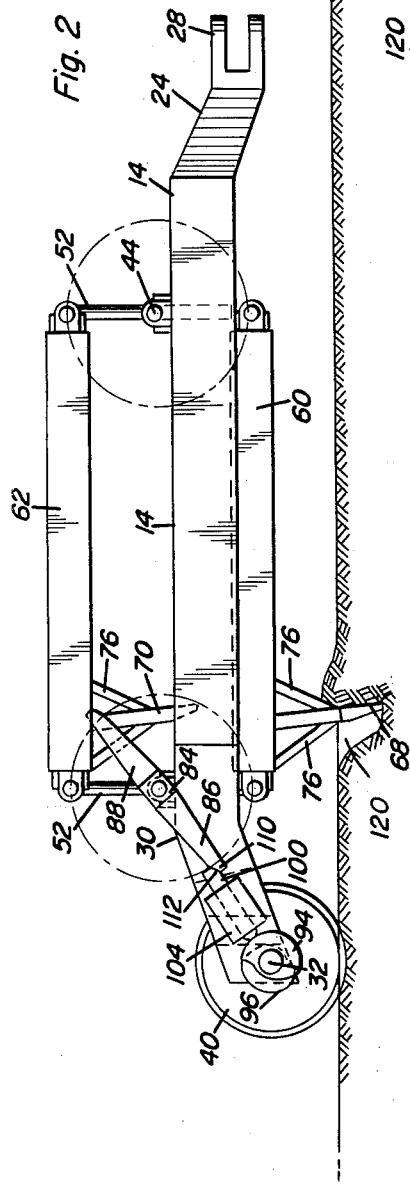
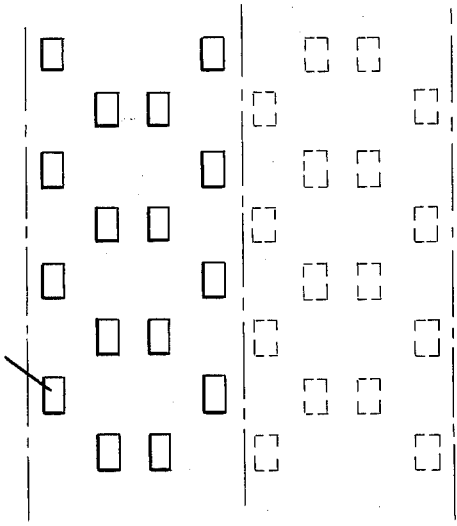
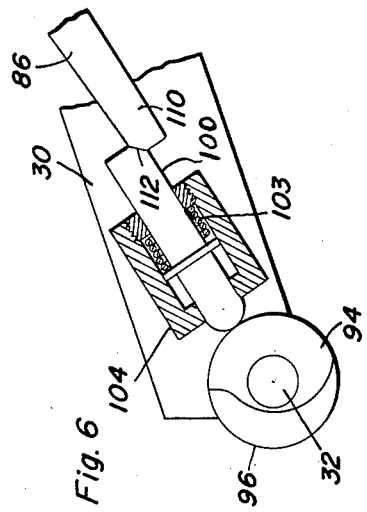
Ferdinand P. King
INVENTOR.
BY *Clarence A. O'Brien*
and *Harvey B. Jacobson*
Attorneys

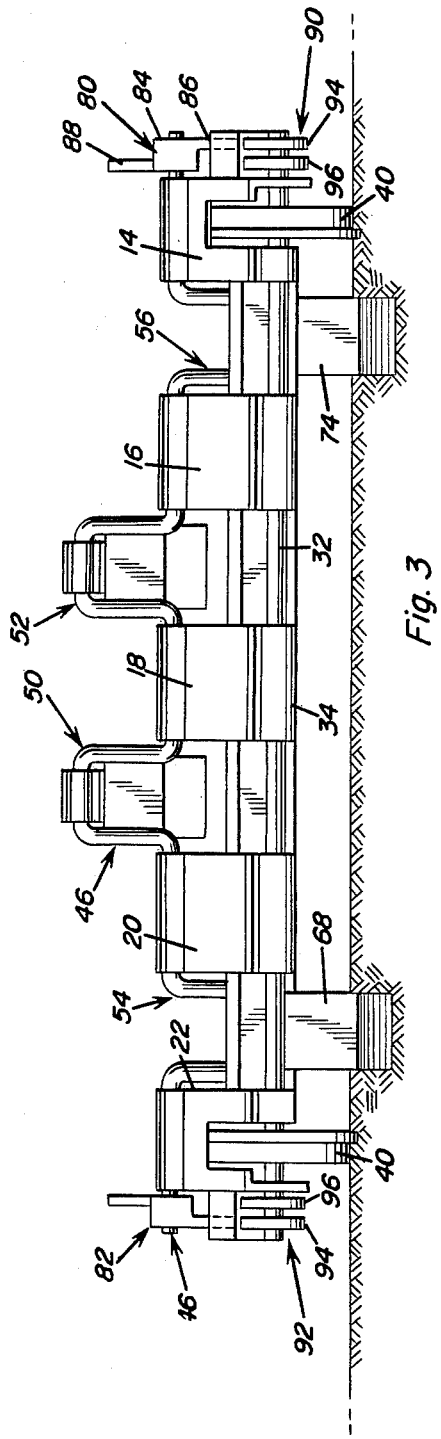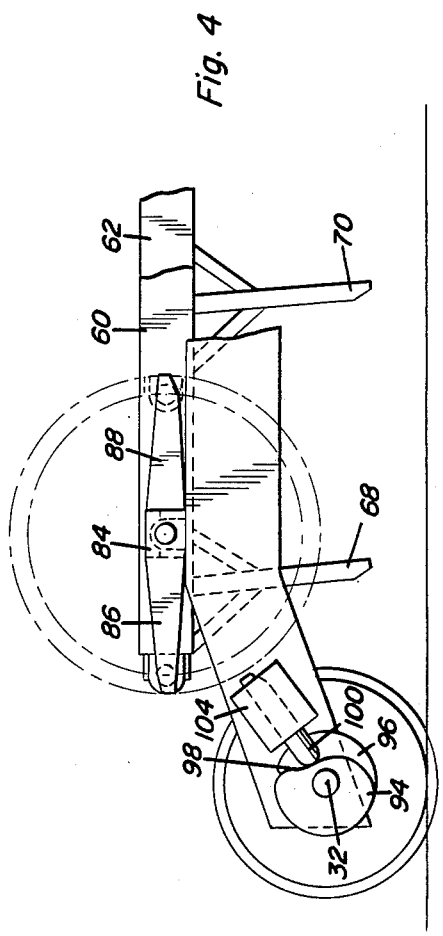
Ferdinand P. King
INVENTOR.

United States Patent Office 3,072,199
Patented Jan. 8, 1963

3,072,199
PIT PLOW
Ferdinand P. King, Rte. C, Lamesa, Tex.
Filed Mar. 8, 1960, Ser. No. 13,611
5 Claims. (Cl. 172—86)

This invention relates generally to farm equipment and more particularly to a plow specifically designed for pit plowing a range or farm land.

It has been found that by constructing pits on sloping or flat range or farm land, rain-fall may be retained for promoting vegetation, decreasing wind and water erosion, and increasing productivity of the soil. The pits to be formed should be approximately 16 inches in width, 24 inches in length, and about 9 inches in depth. The pits should be arranged in some sort of staggered pattern which would meet with the approval of local, national, or international agencies concerned with soil and water conservation, range management, and soil productivity. Also, it is to be appreciated that the dimensions indicated as appropriate sizes for the pits are only approximate and considerable variations may be made therefrom.

In view of the above, it is the principal object of this invention to provide a novel plow construction adapted to be drawn by a tractor or such, for forming pits in farm land or such.

It is a more particular object of this invention to provide a novel plow construction which is of relatively simple design and accordingly comparatively inexpensive. Also, the simple design assures the reliability and durability of the plow. The particular novel construction efficiently forms pits in the land according to a pattern and size as desired. By changing the components of the plow, the size and pattern of the pits may be varied.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is an elevational side view of the plow construction illustrating the plow components at the extremity of their movements;

FIGURE 3 is a rear elevational view of the plow construction;

FIGURE 4 is a partial elevational side view of the plow construction illustrating the plow components in a neutral position;

FIGURE 5 is a representative plan view illustrating the type of pit pattern formed by the plow, and FIGURE 6 is an enlarged fragmentary view of the left-hand portion of FIGURE 2 with parts of the plow broken away and shown in section to illustrate more clearly certain structural details thereof.

Figure 1:
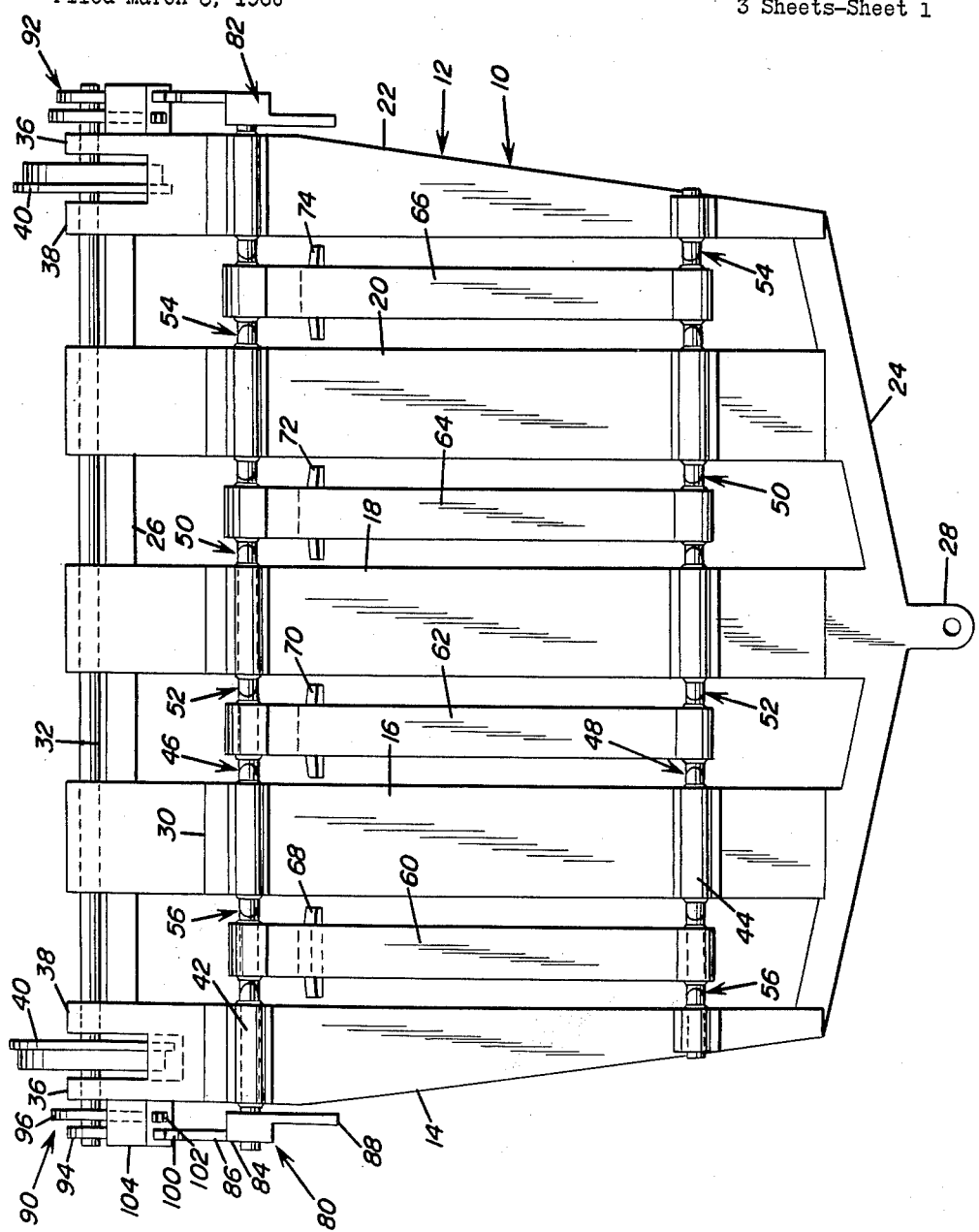
FIGURE 1 is a top plan view of the plow construction.

With continuing reference to the drawings, numeral 10 generally represents the plow construction including a frame 12 defining a series of longitudinal beams 14, 16, 18, 20 and 22 connected by front and rear transverse beams 24 and 26. The transverse beam 24 is provided with a hitch 28 for securing the plow 10 to a self-propelled vehicle as a tractor. As will be noted, the longitudinal beams are spaced from each other as is particularly indicated in FIGURES 1 and 3. Further, it is to be noted that each of the longitudinal beams slopes downwardly as at 30 at the rear thereof.

An axle 32 is rotatably journalled in bearings 34 carried by each of the longitudinal beams 14, 16, 18, 20 and 22. Each of the beams 14 and 22 are bifurcated at the rear thereof defining portions 36 and 38 between which ground wheels 40 are disposed. The ground wheels 40 are each secured to the axle 32. Each of the ground wheels 40 is flanged and it is contemplated that the wheels be approximately 27 inches in diameter in order that one revolution will travel approximately a lineal distance of 84 inches. The flanged wheels allow the plow to move more easily over all types of terrain.

Cap bearings 42 are disposed on the top surface of each of the longitudinal beams adjacent the rear thereof. Cap bearings 44 are disposed on the front end of the longitudinally extending beams. A first crank shaft 46 is disposed for rotatable movement within the cap bearings 42 while a second crankshaft 48 is disposed for rotatable movement in the cap bearings 44. The crankshafts 46 and 48 are identical and each define identical pairs of inner throws 50 and 52 and identical pairs of outer throws 54 and 56. The throws 50 and 52 are diametrically opposed to the throws 54 and 56. The throws of the crankshafts 46 and 48 are disposed between the spaced longitudinally extending beams as is especially indicated in FIGURES 1 and 3. Pivotally secured to and between the corresponding throws of the crankshafts 46 and 48 are walking beams 60, 62, 64 and 66. The walking beams 60, 62, 64 and 66 are provided with depending pit plow blades 68, 70, 72 and 74 respectively. Struts 76 may be utilized to brace the pit plow blades to the walking beams.

Secured to each end of the first crankshaft 46 are timing arm assemblies 80 and 82. Each of the timing arm assemblies 80 and 82 include a hub 84 and radially extending timing arms 86 and 88 extending therefrom. The timing arm assembly 80 is secured to the first crankshaft 46 and rotates therewith. The timing arms 86 and 88 are diametrically opposed and correspond with the diametric opposition of the throw pairs. It is to be noted that the timing arms 86 and 88 are transversely spaced.

Secured to each end of the axle 32 are cam assemblies 90 and 92. Each of the cam assemblies 90 and 92 include cams 94 and 96 which are substantially disk-shaped and are secured to the axle 32. The cams 94 and 96 are transversely spaced and are substantially aligned with the timing arms 86 and 88. Each of the cams 94 and 96 define a circumferential flat portion thereon as at 98. Mounted adjacent to and in alignment with each of the cams 94 and 96 are cam follower bars 100 and 102. The cam follower bars 100 and 102 are mounted for reciprocal movement in housing 104. The bars 100 and 102 are each spring-urged into engagement with the respective cams 94 and 96 respectively by means of a spring 103, see FIGURE 6. Moreover, the bars 100 and 102 are transversely spaced and in alignment with the timing arms 86 and 88. The timing arms 86 and 88 define a beveled edge 110 thereon which are engageable with beveled edges 112 formed on the cam follower bars 100 and 102.

In the normal operation of the pit plow 10, a tractor pulls the pit plow 10 by securing a drawbar to the hitch 28. As the plow 10 is drawn along the ground surface, the flanged wheels 40 cause the axle 32 to rotate in the bearings 34. Accordingly, the cams 94 and 96 turn and the flat sides 98 thereof turn into opposed relationship with respect to the cam follower bars 100 and 102. Attention is called to FIGURE 2 wherein the round side of cam 94 is engaged with the bar 100 while the flat side of the cam 96 is engaged with the bar 102. The rounded side of the cam 94 urges the bar 100 away from the cam 94 and into engagement with the timer arm 86. The timer arm 86 is of course secured to the hub 84 of the timer assembly 80 and inasmuch as the hub 80 is secured to the crankshaft 46, the crankshaft is prevented from rotating. Inasmuch as the crankshaft is retained in the position indicated, the outer throw pairs 54 and 56 depend toward the ground surface engaging the plow blades 68 and 74 with the soil to form pits 120 as indicated. Upon further rotation of the wheels 40 and axle 32, the flat side of the cam 94 moves into opposition to the bar 100 while the rounded side of the cam 96 moves into oppositin to the bar 102. The bar 100 is therefore spring urged toward the flat side of cam 94 and moved out of engagement with respect to the timer arm 86. The blades 68 and 74 are moved rearwardly by the force of the soil and the crankshafts 46 and 48 are caused to rotate so as to move the throws 50 and 52 toward the ground surface. The blades 70 and 72 thereby engage the soil to form inner pits as indicated in FIGURE 5 with the bar 102 engaging the timer arm 88 to retain the blades 70 and 72 in engagement with the soil for one-half of the cycle.

It will therefore be appreciated that as the pit plow 10 is drawn along the ground, the blades 68, 70, 72 and 74 will engage the surfaces to form the pits indicated by the numeral 120 in FIGURE 2 so as to form the pit pattern illustrated in FIGURE 5. Of course, a different pit pattern may be formed by making use of different crankshaft formations.

Aside frm utilizing the pit plow construction for forming pits for retaining water and preventing erosion, the device could be used in conjunction with seeding units which would seed either continuously or within the perimeter or confines of the pits only. Other uses of the particular pit plow construction will occur to those skilled in the art.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pit plow comprising a longitudinally extending frame, ground engaging wheels, means carried by said frame journalling said ground engaging wheels for rotation about axes extending transversely of said frame, a plurality of transversely spaced digging blades, mounting means carried by said frame mounting said blades for movement between raised retracted positions and lowered ground engaging positions relative to said frame, said mounting means including means mounting on blade for inverse movement relative to another blade, lock means movably mounted on said frame for movement between retracted and extended positions in response to rotation of said wheels for intermittent engagement by portions of said mounting means automatically alternately retaining the blades stationary in the lowered ground engaging positions in timed sequence upon rotation of said ground engaging wheels.

2. The combination of claim 1 wherein said mounting means includes a pair of crankshafts journalled from said frame for free rotational movement about longitudinally spaced transversely extending axes, said crankshafts each including a plurality of eccentric throws, a longitudinally extending walking beam having its opposite end portions pivotally secured between corresponding throws of said crankshafts, each of said blades being dependingly supported from one of said beams.

3. The combination of claim 2 including a pair of timing arms carried by at least one of said crankshafts, said journalling means including an axles to which said wheels are secured for rotation therewith extending transversely of and journalled from said frame, said lock means including a pair of cam means secured to said axle, a pair of cam follower abutment means carried by said frame and slidably mounted on the latter for movement radially of said axle, said cam follower abutment means each radially aligned with a corresponding one of said cam means and with a corresponding one of said timing arms, said cam follower means being normally yieldably biased toward said axle and engageable with the outer ends of corresponding timing arms when in extended positions urged away from said axle by way of said cam means, said timing arms projecting in generally radially diametrically opposed directions away from said one crankshaft and spaced longitudinally along the latter, said cam means including toe portions extending radially outwardly of opposite sides of said axle.

4. The combination of claim 3 wherein said axle includes two pair of cam means disposed on opposite end portions of said axle, said frame including corresponding pairs of cam follower means and said one crankshaft including two pairs of timing arms on opposite end portions of said one crankshaft radially aligned with corresponding cam followers.

5. The combination of claim 1 wherein said mounting means includes a pair of crankshafts journalled from said frame about longitudinally spaced transversely extending axes, said crankshafts each including a plurality of eccentric throws, a longitudinally extending walking beam having its opposite end portions pivotally secured between corresponding throws of said crankshafts, each of said blades being dependingly supported from one of said beams, said crankshafts being free of driving connection with said wheels and journalling means, a pair of timing arms carried by at least ones of said crankshafts, said journalling means comprising an axle to which said wheels are secured for rotation therewith extending transversely of and journalled from said frame, and cam means carried by said axle engageable with said timing arms controlling the rotation of said crankshafts and comprising a portion of said lock means.

References Cited in the file of this patent
UNITED STATES PATENTS

| | | |
|---|---|---|
| 244,808 | Jones | July 26, 1881 |
| 1,210,092 | Mokay | Dec. 26, 1916 |
| 2,044,304 | James | June 16, 1936 |
| 2,113,341 | Anderson | Apr. 5, 1938 |
| 2,220,659 | Petzonot | Nov. 5, 1940 |
| 2,767,633 | Franz | Oct. 23, 1956 |